United States Patent
Platt et al.

(10) Patent No.: US 7,223,298 B2
(45) Date of Patent: May 29, 2007

(54) FILTER ASSEMBLY FOR PIPELINES

(75) Inventors: Keith Platt, Dayton, TX (US); Jon Carnell, Broken Arrow, OK (US)

(73) Assignee: PGR Filters, L.L.C., Highlands, TX (US)

( * ) Notice: Subject to any disclaimer, the term of this patent is extended or adjusted under 35 U.S.C. 154(b) by 0 days.

(21) Appl. No.: 11/082,259

(22) Filed: Mar. 17, 2005

(65) Prior Publication Data

US 2006/0207426 A1    Sep. 21, 2006

(51) Int. Cl.
  *B01D 46/24* (2006.01)
  *B01D 46/00* (2006.01)
  *B01D 45/08* (2006.01)

(52) U.S. Cl. .................. 95/286; 95/1; 95/268; 95/273; 95/287; 55/356; 55/357; 55/385.1; 55/410; 55/417; 55/418; 55/419; 55/465; 55/482; 55/484; 55/495; 55/503; 210/340; 210/348

(58) Field of Classification Search .................. 55/356, 55/357, 385.1, 410, 417, 418, 419, 482, 484, 55/495, 503, 465; 210/340, 341, 343, 348; 95/1, 273, 286, 287, 268; 134/8, 10, 22.1, 134/22.11; 15/104.05, 104.061

See application file for complete search history.

(56) References Cited

U.S. PATENT DOCUMENTS

| | | | |
|---|---|---|---|
| 1,652,173 A * | 12/1927 | Lalor | ......................... 210/341 |
| 2,252,959 A | 8/1941 | Blair, Jr. | |
| 2,767,138 A | 10/1956 | Loeffler et al. | |
| 2,915,422 A | 12/1959 | Stone | |
| 2,937,503 A | 5/1960 | Swearingen et al. | |
| 3,488,168 A | 1/1970 | Ludt et al. | |
| 3,546,926 A | 12/1970 | Dunavent, Jr. et al. | |
| 3,646,730 A * | 3/1972 | Reid | ........................... 55/419 |
| 3,665,966 A | 5/1972 | Ver Nooy | |
| 3,682,186 A * | 8/1972 | Howe | ............................. 134/8 |
| 3,778,799 A | 12/1973 | Bendayan | |
| 3,888,644 A * | 6/1975 | Holland et al. | ................ 55/484 |

(Continued)

OTHER PUBLICATIONS

Girard Industries, "Pig Launching & Receiving Procedures", www.girardind.com/valves-launching.htm.

Primary Examiner—Jason M. Greene
(74) Attorney, Agent, or Firm—Kean, Miller, Hawthorne, D'Armond, McCowan & Jarman, LLP

(57) ABSTRACT

A filter assembly is disclosed for use in connection with the filtration of products transported via pipelines, including high pressure gas pipelines. The disclosed filter assembly is comprised of a plurality of filter modules, a series of valves, inlet and outlet ports, connective piping, and spool pieces. The filter assembly will temporarily redirect flow from the pipeline, through one or more filter assemblies, and back into the original pipeline a short distance downstream from the original takeout point. If flanged connections are not readily available for a particular section of pipeline, the filter assembly can be connected to virtually any section of pipe through "hot tapping" technology, which allows a valve to be placed on an active and pressurized section of pipeline. The filter assembly of the present invention allows the operator to replace expired filtering members by shifting product flow from one filter module to another, thereby avoiding the need to take the pipeline out of service during filtering operations. The filter assembly may also be mounted on a skid and/or a mobile trailer.

40 Claims, 9 Drawing Sheets

U.S. PATENT DOCUMENTS

| | | |
|---|---|---|
| 4,095,965 A | 6/1978 | Neumann et al. |
| 4,209,311 A | 6/1980 | Deeg et al. |
| 4,297,116 A * | 10/1981 | Cusick ................ 55/484 |
| 4,528,041 A * | 7/1985 | Rickey et al. ............ 134/8 |
| 4,836,017 A | 6/1989 | Bozek |
| 5,055,180 A | 10/1991 | Klaila |
| 5,092,913 A * | 3/1992 | Yen .................... 95/286 |
| 5,514,194 A | 5/1996 | Tullis et al. |
| 5,769,955 A * | 6/1998 | Kozisek ................ 134/8 |
| 5,772,879 A * | 6/1998 | Jaikaran ............... 210/340 |
| 5,775,442 A | 7/1998 | Speed |
| 5,975,142 A * | 11/1999 | Wilson ................. 138/89 |
| 6,063,151 A | 5/2000 | Burns, Jr. et al. |
| 6,203,714 B1 * | 3/2001 | Bos et al. ............. 210/341 |
| 6,328,812 B1 | 12/2001 | Huang |
| 6,361,616 B1 * | 3/2002 | Rose .................... 134/8 |
| 6,841,007 B1 * | 1/2005 | Howard et al. ............ 134/8 |
| 2002/0079248 A1 | 6/2002 | Kresnyak |
| 2003/0015481 A1 | 1/2003 | Eidem |
| 2003/0116500 A1 | 6/2003 | Hoffmann |

* cited by examiner

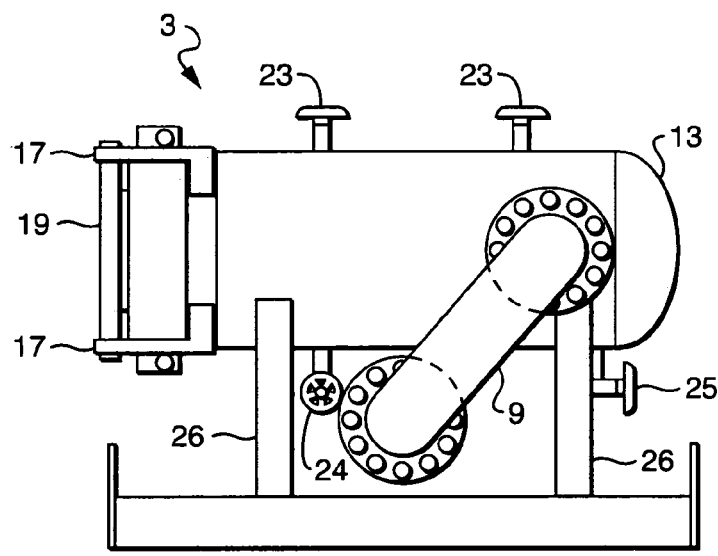
FIG. 3
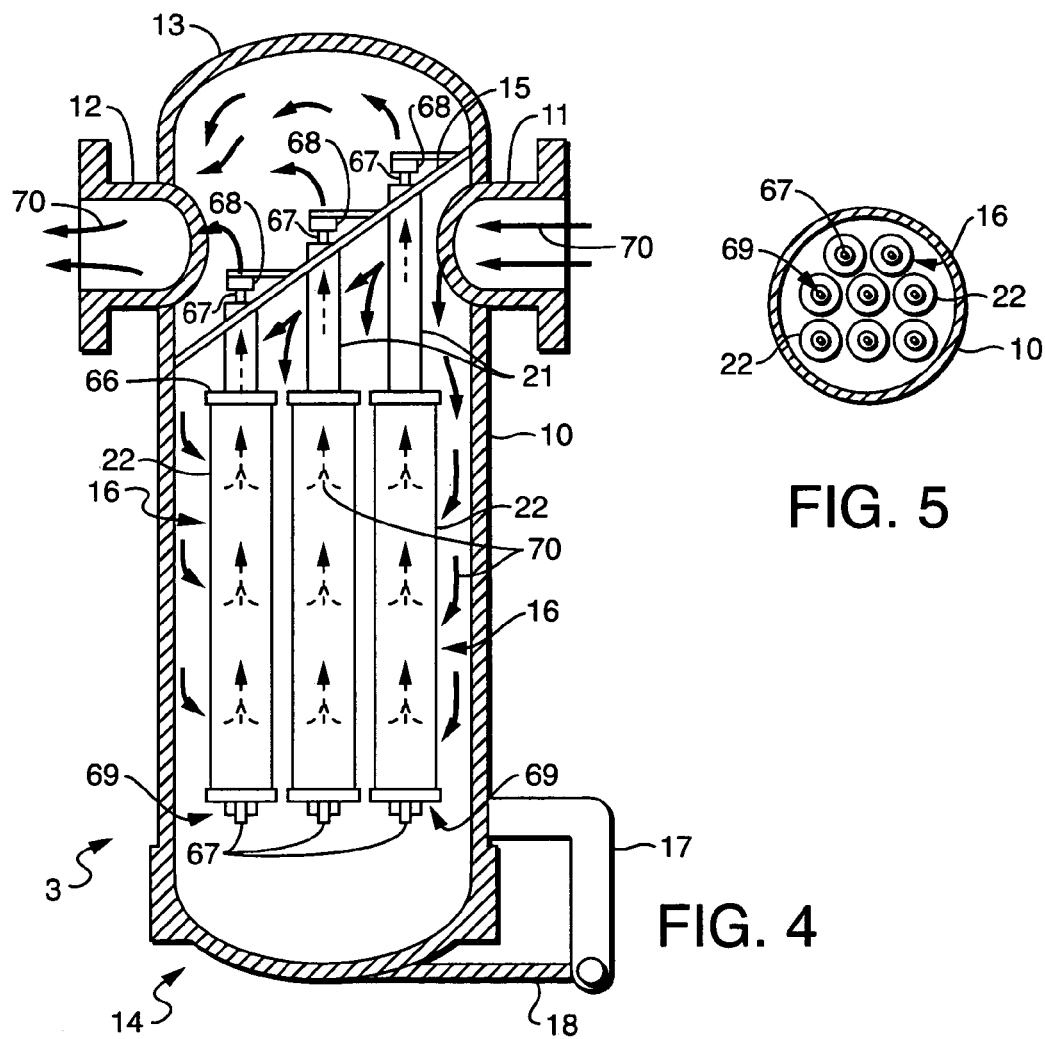
FIG. 5
FIG. 4

FILTER ASSEMBLY FOR PIPELINES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable

BACKGROUND OF THE INVENTION

1. Field of the Invention

This invention relates to the field of pipelines and the filtration of products that flow therethrough.

2. Description of Related Art

Pipelines can transport any number of liquid or gaseous products. Because of the inherent nature of the material from which pipelines are constructed and the nature of the products that they carry, the internal surfaces of pipelines tend to become corroded over time, producing rust, sediment and the like. In addition, pipelines may contain construction debris, such as welding rods, rags, and sand, which is often present immediately after construction of a pipeline. Finally, the inside surfaces of pipelines may also become coated with various deposits, which accrue as a result of ordinary pipeline use.

The types of materials deposited on the inside surface of a pipeline usually depend on the type of pipeline and the product being conveyed by the pipeline. Typical accumulations include pipeline rouge, rust, mill scale, sediment, and materials attributable to specific operations, including paraffin deposits, sludges, and the like.

If allowed to accumulate, the corrosion byproducts and deposits will increase the possibility of pipeline leaks and/or rupture. The accumulation of corrosion byproducts and deposits will also eventually hinder the ability to transport product through the pipeline at optimum flow rates and will degrade the quality of the transported product. More importantly, the buildup of pipeline rouge, deposits, particulate matter, impurities, and the like may present a hazardous situation if left unaddressed, because such accumulations may reduce the overall surface area for a given cross-section of pipe, thereby increasing the pressure associated with a particular pipe section. If the pressure exceeds the design threshold, then the possibility of a pipeline rupture and/or explosion is imminent.

The aforementioned hazards are especially troublesome for owners or operators of pipelines that are used to transport gaseous products, which are often highly flammable. Gaseous products are commonly compressed (at compressor stations) during transit in order to move the product efficiently and to increase the volume a pipeline can transport. Thus, pipelines capable of withstanding high pressures are typically used in order to minimize pressure losses over long distances. High pressure pipelines are usually capable of conveying gaseous products at pressures of 600 psi or higher. Typical products that may be carried by high pressure gas pipelines include, without limitation, oxygen gas, methanol, propylene, polyethylene, methane, polypropylene, ethylene, hydrogen gas, and natural gas.

In the past, the problem of sediment and deposit buildup in pipelines has been addressed by isolating a targeted section of pipe and forcing a spherical or cylindrical object (a/k/a/ a pipeline "pig") through the line under pressure to remove the debris. A pig typically has wire bristles or a similarly abrasive surface that will contact the inner surface of the pipeline and scrape away any accumulations or loose sediment, which will be pushed along in front of the pig in the form of particulate matter as it makes its way through a given section of pipe. This process sometimes requires that the isolated section of line be taken out of service, which may have the effect of interrupting product flow over a long distance. Because high pressure gas pipelines optimally carry approximately 2,000 barrels/day (bbl/day), the cost of shutting down such a line can be very costly. An additional consequence of shutting down a high pressure pipeline is that any product located within the isolated section of line must be either disposed of by venting portions of the product to the atmosphere, or by routing it to another section of pipe. Both of these options require the wasting of precious resources. The same is true when isolating sections of a liquid pipeline.

In order to avoid the expense associated with taking a high pressure gas pipeline out of service, owners and operators of high pressure gas lines have long sought a means for removing sediment and accumulations from pipelines in a manner that avoids the need to take the line out of service. The need for such a device has also been driven more recently by various regulations that require pipeline owners or operators to perform pipeline integrity inspections and maintenance every few years. See, e.g., Department of Transportation (Office of Pipeline Safety) regulations at 40 C.F.R. Part 195.

A number of inventions have been developed that relate to the filtration of products in pipelines. For example, known prior art includes U.S. Pat. Nos. 6,328,812, 6,063,151, 5,775,442, 5,514,194, 5,055,180, 4,836,017, 4,209,311, 4,095,965, 3,778,799, 3,665,966, 3,546,926, 3,488,168, 2,937,503, 2,915,422, 2,767,138, and 2,252,959; and U.S. Pat. Pub. Nos. US 2003/0116500, 2003/0015481, and 2002/0079248. However, each of these references and applications fails to address each of the aforementioned problems.

What is needed is an improved filter assembly that will allow the owner, operator, or contractor to filter products transported by pipeline in order to remove any debris, sediment, or other impurities from the product itself. What is further needed is an improved filter assembly that will allow the filtering of product to occur without requiring the owner or operator to take a particular section of product line out of service for a significant period of time. What is further needed is an improved filter assembly for use in connection with high pressure gas pipelines.

OBJECTS OF THE INVENTION

It is an object of the present invention to provide an improved filter assembly that will allow the owner, operator, or contractor to filter products transported by pipeline in order to remove any debris, sediment, or other impurities from the product itself.

It is another object of the present invention to provide an improved filter assembly that will allow the filtering of product to occur without requiring the owner or operator to take a particular section of product line out of service for a significant period of time.

It is another object of the invention to provide an improved filter assembly that is adaptable for use in connection with a high pressure gas pipeline.

It is another object of the invention to provide an improved filter assembly having filter modules that are capable of directing the flow of gaseous product in a direction that is substantially parallel to the orientation of the filtering members contained in the filter modules.

It is another object of the invention to provide an improved filter assembly that allows one or more filters or filtering members to be recharged or replaced without interrupting product flow through the pipeline.

It is another object of the invention to provide an improved filter assembly that includes a series of valves to selectively direct product flow to one or more filter modules.

It is another object of the invention to provide an improved filter assembly that may be mounted on a skid and/or a mobile trailer.

It is another object of the invention to provide an improved filter assembly that may be connected to a pipeline using spool pieces that are adaptable to any American National Standards Institute (ANSI) bolt pattern.

BRIEF SUMMARY OF THE INVENTION

The present invention solves the problem presented by the prior art by providing a modular filter apparatus that can be connected to a pressurized section of pipe. The following description primarily focuses on the use of a filter apparatus in connection with the filtration of high pressure gas lines; however, it will be readily understood that the present apparatus could also be used in connection with other types of pipelines, including liquid pipelines.

The filter assembly of the present invention may be comprised of at least two high pressure filter modules, a series of valves, inlet and outlet ports, and connective piping. The filter assembly will temporarily redirect flow from the pipeline, through one or more filters, and back into the original pipeline a short distance downstream from the original takeout point. If flanged connections are not readily available on a particular section of pipeline, the filter assembly can be connected to virtually any section of pipe through "hot tapping" technology, which allows a valve to be placed on an active and pressurized section of pipeline.

In one embodiment, the filter apparatus of the present invention is utilized according to the following procedure. First a section of pipeline is identified for filtration. Next, the operator or contractor may install two "hot tap" tee connections, one for product leaving the pipeline and one for product returning to the pipeline. Alternatively, the owner or operator may have previously installed a set of accessible tee connections at a particular access station during pipeline construction.

Once the tee connections are installed, the operator or contractor may position the filter assembly in close proximity to the pipeline and tee connections. As shown in the attached drawings, the filter assembly includes a flanged inlet port and a flanged outlet port. Spool pieces may be attached from the upstream tee connection to the inlet port, and likewise from the downstream tee connection to the outlet port. If the bolt patterns of the inlet and outlet flanges differ from the bolt patterns of the tee connections, spool adapters can be installed in various standard ANSI bolt patterns to accommodate the various fittings. In addition, the spool pieces connecting the upstream and downstream tee connections may also contain valves to regulate and/or isolate product flow to and from the filter assembly. Finally, a closure valve should also be located between the upstream and downstream tee connections.

After the spool pieces are installed and secured, but before directing product flow through the filter assembly, the operator will open one set of valves on the filter assembly in preparation for filtering operations. For example, referring to FIGS. 1 and 2, the top and bottom valves on the right side may be opened, while the top and bottom valves on the left side will initially remain closed. The valves on the filter assembly may be, for example, full port or reduced port ball valves with double block and bleed capability. Once the set of valves on the right side of the filter assembly are opened, the flow of product through the pipeline can be redirected by opening the upstream and downstream valves located on the upstream and downstream spool pieces and blocking the product flow between the two tee connections. The product flow will thereafter be redirected from the upstream tee connection and into the inlet port, through the bottom valve on the right side, through the right side filter, through the top valve on the right side, through the outlet port, and back into the pipeline via the downstream tee connection.

The purpose of opening one set of valves at a time is to utilize one filter at a time in order to allow for continuous product flow. For example, as the filter on the right approaches capacity, the filter on the left can be phased in slowly by opening the top and bottom valves on the left side. At the same time, the top and bottom valves on the right side can be slowly closed until flow is completely directed through the filter on the left side. In this manner, one filter can be changed without interrupting product flow. If desired, the activation of one or more valves can be controlled electronically via a computer program or the like.

The filters utilized in the present invention are designed to accommodate a flow rate of approximately 2000 bbl/hr or greater at an operating pressure of approximately 2,280 psi. The number of filtering members contained in each filter module may vary in accordance with the needs of the user; for example, the standard number of filtering members may range from 8–30 per filter module. In one embodiment, inlet and outlet ports for each filter module are located near the extreme end of the unit, with a baffle to direct flow in a direction substantially parallel to the orientation of the filtering members, in order to prevent the filtering members from being damaged by high velocity perpendicular flow.

Additional features of the present invention include the connection of multiple filter modules in parallel or in series, the inclusion of gauges and instrumentation on the filter housing or in close proximity thereto, the inclusion of a nitrogen purge port for cleaning out of service filters without the risk of explosion, and the inclusion of one or more drain and vent ports. Finally, the present filter assembly could be mounted to a trailer and/or a skid for towing to the desired location.

The present invention has several advantages over the existing prior art devices and systems. One advantage of the present invention is that it allows the user to easily filter products transported by pipeline in order to remove debris, sediment, or other impurities from the transported product.

Another advantage of the present invention is that it allows the filtering of product to occur without requiring the owner or operator to take a particular section of product line out of service for a significant period of time.

Another advantage of the present invention is that it is adaptable for use in connection with a high pressure gas pipeline.

Another advantage of the present invention is that it includes filter modules that are capable of directing the flow of gaseous product in a direction that is substantially parallel to the orientation of the filtering members contained in the filter modules.

Another advantage of the present invention is that it allows one or more filters or filtering members to be recharged or replaced without interrupting product flow through the pipeline.

Another advantage of the present invention is that it includes a series of valves to selectively direct product flow to one or more filter modules.

Another advantage of the present invention is that it may be mounted on a skid and/or a mobile trailer.

Another advantage of the present invention is that it may be connected to a pipeline using spool pieces that are adaptable to any American National Standards Institute (ANSI) bolt pattern.

These and other objects, advantages, and features of the invention will be apparent from the following description.

BRIEF DESCRIPTION OF THE DRAWINGS

FIG. 3 depicts an alternate side view of the filter assembly.
FIG. 4 depicts a cross-section of a single filter module.
FIG. 5 depicts a cross section of a single filter module, showing a lengthwise view of the filtering members.

DETAILED DESCRIPTION OF THE INVENTION

Figure 1:
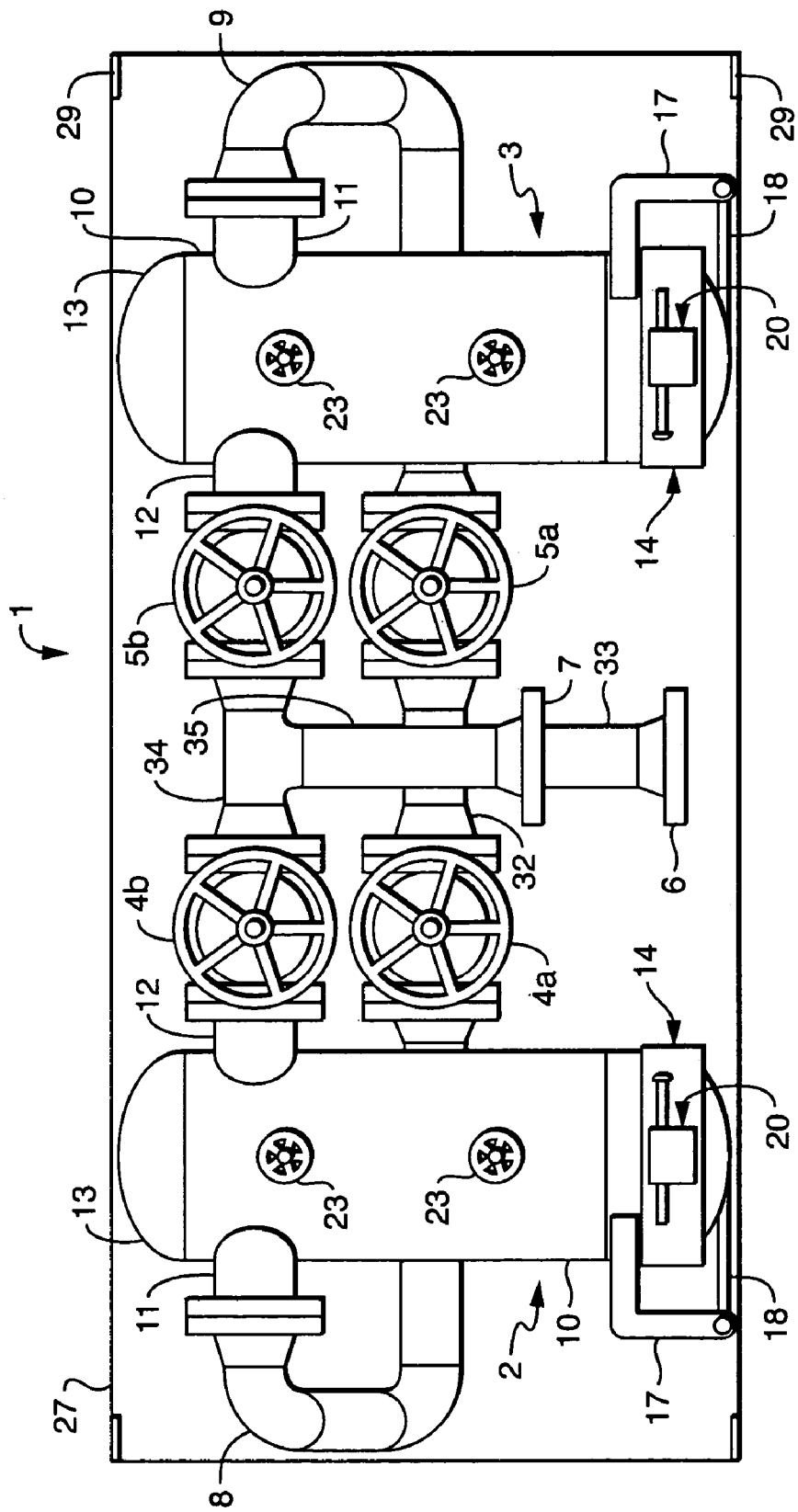
FIG. 1 depicts a plan view of the filter assembly.
Figure 2:
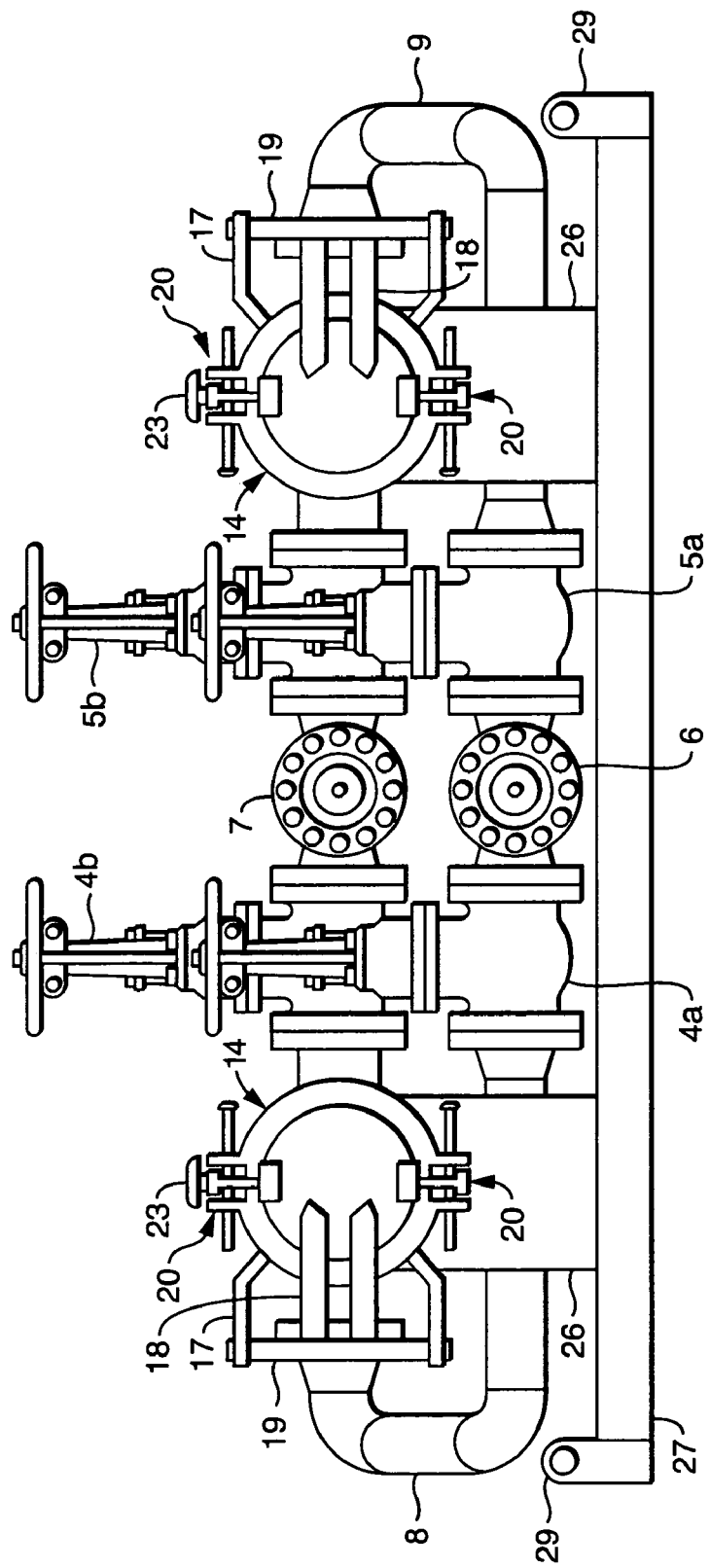
FIG. 2 depicts a side view of the filter assembly.
Figure 6:
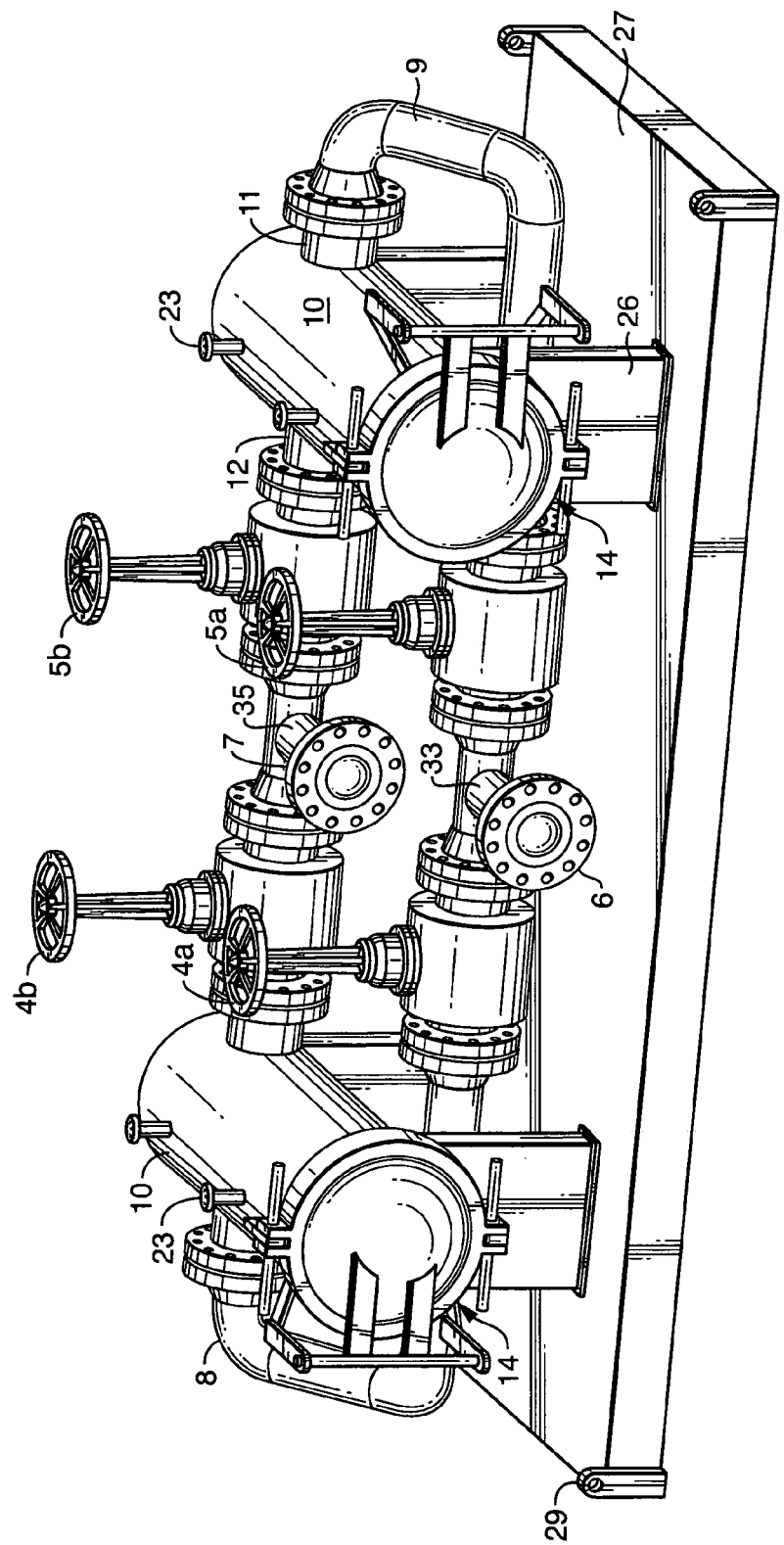
FIG. 6 is a perspective view of the filter assembly.

With reference to FIGS. 1–11, one or more embodiments of the improved filter assembly will now be described. As shown in FIGS. 1 and 2, filter assembly 1 generally comprises filter modules 2 and 3, valves 4a, 4b, 5a, and 5b, inlet port 6, outlet port 7, and connective piping 8 and 9. For ease of discussion, the functions of filter assembly 1 will be discussed below in connection with the filtration of gaseous products conveyed in high pressure gas pipelines. However, those of ordinary skill in the art will appreciate that the instant invention may also be connected to virtually any pipeline, including without limitation low pressure pipelines, for purposes of filtering a variety of products, whether liquid, gaseous, or otherwise.

Assuming that filter assembly 1 is intended to filter gaseous products under high pressure, filter modules 2 and 3 (as shown in FIGS. 3 and 4) are each generally comprised of filter housing 10, inlet flange 11, outlet flange 12, end cap 13, closure door 14, baffling structure 15, and filtering members 16. Filter housing 10 may be constructed using any material capable of withstanding the high pressures associated with the transportation of gaseous products. For example, carbon steel having a wall thickness of 1.5 inches would be capable of withstanding pressures of up to 2,160 psi at 100 degrees F. Alternatively, carbon steel having a wall thickness of 4 inches would be capable of withstanding pressures of 3,000 psi at 100 degrees F.

Those of skill in the art will understand that various materials could be selected for the construction of housing 10, depending on the product being transported and the maximum temperatures and pressures expected at filter assembly 1. For example, in addition to steel or carbon steel, housing 10, could be constructed from, among other things, the following materials, depending on the application: stainless steel, steel alloys, and non-ferrous materials, including carbon fiber, fiber basalt, resin composites, polymers, plastic, or from any other material from which pipelines are constructed. It will also be readily understood that any spooling or connective piping 8, 9 associated with filter assembly 1 may be constructed from the same or similar materials. If filter housing 10 is intended to receive and filter gaseous products from high pressure gas lines, then filter housing 10 should be constructed from any material capable of withstanding internal pressures of approximately 2,280 psi or higher.

In the embodiment shown in FIG. 4, inlet flange 11 and outlet flange 12 are located near end cap 13, opposite from closure door 14. It will also be readily appreciated by those skilled in the art that inlet and outlet flanges 11, 12 may also be located near closure door 14. The purpose of locating inlet flange 11 and outlet flange 12 at one extreme end of filter housing 10 is to allow product flow through filter modules 2, 3 to be reoriented in a direction substantially parallel to filtering members 16 upon contact with baffling structure 15. It will also be understood by those of skill in the art that both inlet flange 11 and outlet flange 12 could be sized to accommodate any volume of flow or pipe size, whether 10", 12", 42", or any other standard pipe size.

Baffling structure 15 may be a tube sheet, metal plate, or the like that is cut and sized to fit inside housing 10 at an angle with respect to inlet flange 11 and outlet flange 12. Baffling structure 15 is shown in FIG. 4 as bisecting the portions of housing 10 near inlet flange 11 and outlet flange 12 at approximately a 45 degree angle; however any angle sufficient to redirect the flow of product in a direction substantially parallel to filtering members 16 may be used. Other baffling structures known to those of skill in the art may also be used in connection with the present invention.

In the embodiments shown in FIGS. 2, 3, 4, and 11, closure door 14 for each filter module 2 and 3 is located opposite end cap 13. Each closure door 14 comprises hinge 17, braces 18, upright 19, hub 60, clamps 61, cap 62, and one or more locking mechanisms 20. Hub 60 encircles the open end of housing 10 (see FIG. 11) and receives and interfaces with cap 62. An o-ring or similar gasket device (not shown) may be inserted between hub 60 and cap 62 in order to create a pressure seal. Clamps 61 are moved into place and rigidly secured against the peripheral edges of cap 62 and hub 60 in order to hold cap 62 firmly in place during operation. In FIGS. 1–3 and 11, locking mechanism 20 is shown as threaded member 63, which is a double-threaded bolt that is threaded in opposite directions at either end and has a hexagonal head or the like on one or both ends. However, locking mechanism 20 may be any standard locking mechanism known to those of skill in the art.

In operation, closure door 14 will remain shut in order to create a complete seal and maintain a constant system pressure. However, when one or more filter modules 2, 3 are taken out of service and the operator desires to open closure door 14, he or she will unlock locking mechanism 20, thus allowing closure door 14, which is connected to brace 18 and upright 19, to swing about hinge 17 and away from housing 10. In the embodiment shown in FIG. 11, locking mechanism 20 is "unlocked" by unscrewing threaded member 63, the center of which is journaled on central projection 64 and the ends of which are threadedly engaged with clamp projections 65. Unscrewing threaded member 63 will force clamps 61 away from each other, due to the opposed threading on each end of threaded member 63. As clamps 61 are forced away from each other in opposite directions, the circumferential tension on cap 62 is reduced until cap 62 swings free of hub 60 and housing 10. It will be readily understood that closure door 14 may further be configured to open and close in accordance with other means known in the art.

Opening closure door 14 allows access to filtering members 16, which may include filter seat stools 21 and filter elements 22. Filter seat stools 21 may be hollow steel tubing or other construction that project through baffling structure 15 and allow product to flow from the inlet side of baffling structure 15 to the outlet side of baffling structure 15. However, the external diameters of each filter seat stool 21 is sealably connected to baffling structure 15. In the embodiment shown in FIG. 4, filter seat stools 21 are flush or nearly flush with the outlet side of baffling structure 15, while projecting lengthwise towards closure door 14 on the inlet side of baffling structure 15. Near the terminal end of each filter seat stool 21 on the inlet side of baffling structure 15 is stool flange 66, which abuts against filter element 22 and prevents filter element 22 from traveling along filter seat stool 21 in the direction of baffling structure 15. A threaded rod 67 is inserted through each filter seat stool 21 and rigidly secured to the outlet side of baffling structure 15 via securing member 68, which may be a nut, a weld, or similar means for rigidly securing threaded rods 67 in place. As shown in FIG. 4, securing member 68 may be held in place with respect to threaded rod 67 via a supporting piece of metal or the like, which may be welded to baffling structure 15. However, it will understood that threaded rods 67 and securing members 68 will not completely obstruct the flow of product through filter seat stools, but will allow the flow of product to escape through filter seat stools 21 on the outlet side of baffling structure 15, and thence through outlet flange 12.

On the inlet side of baffling structure 15, threaded rods 67 extend beyond the terminal end of filter seat stools 21 and stool flanges 66 a distance at least roughly equivalent to the length of filter elements 22. Filter elements 22 may be designed to slide over threaded rods 67 until they contact stool flanges 66. At the opposite ends of filter elements 22, threaded rods 67 extend through the central portion of filter elements 22 and should preferably project far enough beyond filter elements 22 to allow enough room for restricting means 69 to be fastened to the terminal end of threaded rods 67. Restricting means 69, which are shown in FIG. 4 as a washer and hex nut arrangement at the terminal end of each threaded rod 67, are intended to rigidly secure each filter element 22 in place during the filtering process. However, restricting means 69 may be any other means for restricting filter elements 22 known to those of skill in the art, including without limitation a single unitary plate fastened to one or more threaded rods 67 and having a diameter slightly smaller than the diameter or housing 10.

Filter elements 22 may be fabricated from a fiberglass blanket material, pleated paper material, spooled cotton fiber, or any other filtering material known to those of skill in the art. Filter elements 22 may also be of any shape or construction sufficient to entrap, absorb, adsorb, entrain, or otherwise capture particulate matter, liquids, or other impurities contained within a given product stream. The number of filter elements 16 in filter modules 2 and 3 may vary, depending on the application. In a typical embodiment, the number of filtering members 16, filter seat stools 21 and filter elements 22 will range from 8–30 per filter module 2, 3. However, more or fewer filter seat stools 21 and filter elements 22 are contemplated by the present invention. Alternatively, could use any other filter known to those of ordinary skill in the art.

The flow of product through filter modules 2 and 3 will now be described. Referring to the embodiment shown in FIG. 4, and in particular to product flow arrows 70, product flow enters housing 10 through inlet flange 11, where it first is redirected in a direction substantially parallel to filter seat stools 21. Product flow then travels past and around filter seat stools 21 and then past filter elements 22, until it is eventually drawn into and passes through filter elements 22. Upon contacting filter elements 22, most, if not all particulate matter and the like becomes entrapped in filter elements 22. From the interior of filter elements 22, which may have a hollow and pervious central core (not shown), clean air is conducted between the inside diameter of filter element 22 and the outside diameter of threaded rod 67. From this point, product flow travels towards baffling structure 15 along the interior length of each filter element 22, through filter seat stool 21, and through baffling structure 15, until it emerges from filter seat stools 21 on the outlet side of baffling structure 15. Thereafter, clean product flow exits filter housing 10 through outlet flange 12.

Additional features of filter modules 2 and 3 include the addition of pressure relief valves 23, nitrogen purge valve 24, and drain 25. Pressure relief valves 23 are used to bleed off excess pressure once one or more filter modules 2, 3, have been taken out of service and prior to opening closure door 14. Although two pressure relief valves 23 are shown in FIG. 3, each filter module 2, 3 may contain either a single pressure relief valve 23 or a plurality of pressure relief valves 23. Pressure relief valves 23 may be any type of valve known to those of skill in the art and suitable for use in connection with pipelines.

Nitrogen purge valve 24 is used to alleviate any risk of explosion presented when cleaning filter modules 2 and 3, opening closure door 14, or when replacing or repairing filtering members 16. The operator may simply connect a nitrogen source (or similar inert gas) to nitrogen purge valve 24 via a hose or similar connection (not shown) and thereby fill filter module 2, 3 either partially or wholly with an inert gas or material, thereby displacing or rendering inert any flammable process materials and preventing or reducing the risk of explosions. Nitrogen purge valve 24 may be any type of valve known to those of skill in the art and suitable for use in connection with pipelines.

As shown in FIG. 3, drain 25 may be located on the underside of housing 10 in order to facilitate the removal of any liquids that may collect in filter module 2 or 3 during or after the completion of filtration activities. Drain 25 may be any drain fixture know in the art and suitable for use in connection with a filtering apparatus and/or pipelines.

Finally, filter modules 2, 3 may also contain any necessary instrumentation or gauges necessary to ensure safe, efficient, and reliable operation of filter assembly 1. For example, filter modules 2, 3 may contain gauges relating to real-time pressure experienced in one or both filter modules 2, 3 and to the life-span associated with one or more filter elements 22. Other gauges and instrumentation known in the art may also be included, and such gauges and instrumentation may be located on filter housing 10 or in close proximity thereto.

If desired, filer modules 2 and 3 may be mounted atop struts 26, as shown in FIGS. 2 and 3. Alternatively, filter modules 2 and 3 may be configured to lie directly atop skid 27 or trailer bed 28 (this latter embodiment not shown), in which case connective piping 8, 9, nitrogen purge valve 24, and drain 25 would need to be relocated and reconfigured. Finally, filter modules 2, 3 to be modularly integrated into filter assembly 1 in any manner known to those of skill in the art.

Connective piping 8 and 9 connects inlet flanges 11 to valves 4*a* and 5*a*, respectively. Connective piping 8, 9 is shown in FIGS. 1–3 as including two 90 degree elbows and interconnective linear portions, however, connective piping 8, 9 may traverse virtually any course between valves 4*a*, 5*a* and inlet flanges 11 and still be within the scope of the present invention. Additional connective piping (not shown) may also be needed to connect outlet flanges 12 to valves 4*b* and 5*b*, in the event that filter modules 2, 3 are located a greater distance from valves 4*b*, 5*b*, 4*a*, and 5*a* than shown in FIGS. 1 and 2.

If necessary, adapters (not shown) could be fabricated in order to connect inlet and outlet flanges 11, 12 to pipes of different sizes. For example, if inlet and outlet flanges 11, 12 are ANSI 900 flanges capable of connecting to 10" Schedule 80 steel pipe and having 16 bolt holes, but connective piping 8 and 9 is 8" piping that is ANSI 600 rated and having 12 bolt holes, then an adapter would be necessary to secure the 8" ANSI 600 connective piping 8 and 9 to inlet flange 11.

Valves 4*a*, 4*b*, 5*a*, and 5*b*, which are shown in FIGS. 1, 2, 3, and 11, may be any valves known to those of skill in the art and suitable for the intended application. For example, if filter assembly 1 is intended to be used in connection with the filtration of gaseous products under high pressure, then valves 4*a*, 4*b*, 5*a*, and 5*b* may be full port or reduced port ball valves with double block and bleed capability. Valves 4*a*, 4*b*, 5*a*, and 5*b* may also be any other suitable valve known to those of skill in the art, including without limitation full or reduced port gate valves, globe valves, butterfly valves, check valves, plug valves, throttle valves, needle valves, knife valves, solenoid valves, and the like. Additionally, valves 4*a*, 4*b*, 5*a*, and 5*b* may be manually operated valves or may in the alternative be automated valves controlled by a central computer system and operating program to regulate opening and closing of the valves in a continuous, consistent, and/or precise manner. It will further be recognized that more or fewer valves could be used in order to accomplish the intended function herein.

It will be readily understood that valves 4*a*, 4*b*, 5*a*, and 5*b* could be configured in any manner and that two valves of the same type could, in fact, differ in outward appearances. In this regard, in the graphic depictions of valves 4*a*, 4*b*, 5*a*, and 5*b* as shown, for example, in FIGS. 1–3 and 11, are not intended to limit valves 4*a*, 4*b*, 5*a*, and 5*b* to any particular type of valve.

In the embodiment shown in FIGS. 1 and 2, valves 4*a* and 5*a* connect to inlet port 6, and valves 4*b* and 5*b* connect to outlet port 7. Inlet port 6 is shown in FIG. 1 to include inlet manifold 32 and inlet stem 33. Likewise, outlet port 7 is shown to include outlet manifold 34 and outlet stem 35. It will be readily understood that various modifications known to those of skill in the art may be made to inlet port 6 and outlet port 7 but still remain within the scope of the present invention.

In the presently described embodiment, inlet port 6 and outlet port 7 are intended to receive and discharge product flow respectively. However, it will be recognized by those skilled in the art that this relationship could be reversed if desired, thus making outlet port 7 the recipient of incoming product flow and inlet port 6 the recipient of outgoing product flow.

The operation of filter assembly 1 in connection with a standard high pressure gas pipeline will now be described. Referring to the embodiment shown in FIGS. 7 and 8, filter assembly 1 may be rigidly secured to skid 27, which may in turn be rigidly attached to trailer bed 28. Skid 27 may be equipped with eye hooks 29 in order to allow filter assembly 1 to be loaded via crane, fork lift, or the like onto trailer bed 28 or to allow filter assembly 1 to be dragged as a unit behind a truck or tractor to the desired location.

Figure 7:
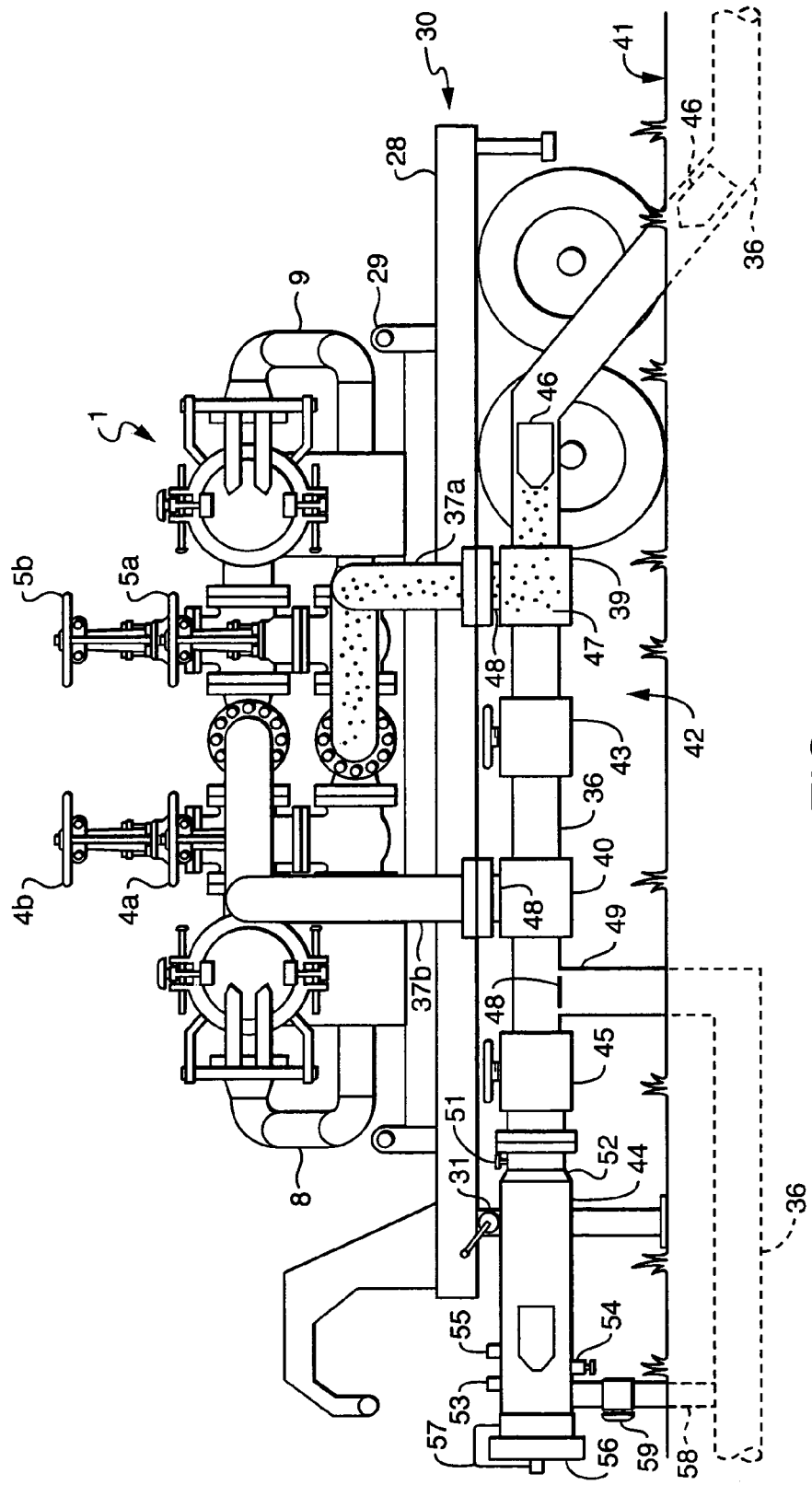
FIG. 7 is a side view of the filter assembly mounted to a mobile trailer and attached to a pipeline.

Trailer bed 28, which forms the horizontal surface of trailer 30, may be constructed of any material suitable for supporting filter assembly 1. Trailer 30 is shown in FIG. 7 as a dual axle goose-neck trailer, but may be any trailer known to those of skill in the art. Trailer 30 may further be equipped with a suitable leveling means 31, in order to ensure proper balance and performance of filter assembly 1. In the embodiment shown in FIG. 7, leveling means 31 is a hand crank jack assembly. Other leveling means 31 known to those of skill in the art may also be used, including hydraulic jacks, electronic jacks, stabilizers, outriggers, and the like.

Figure 8:
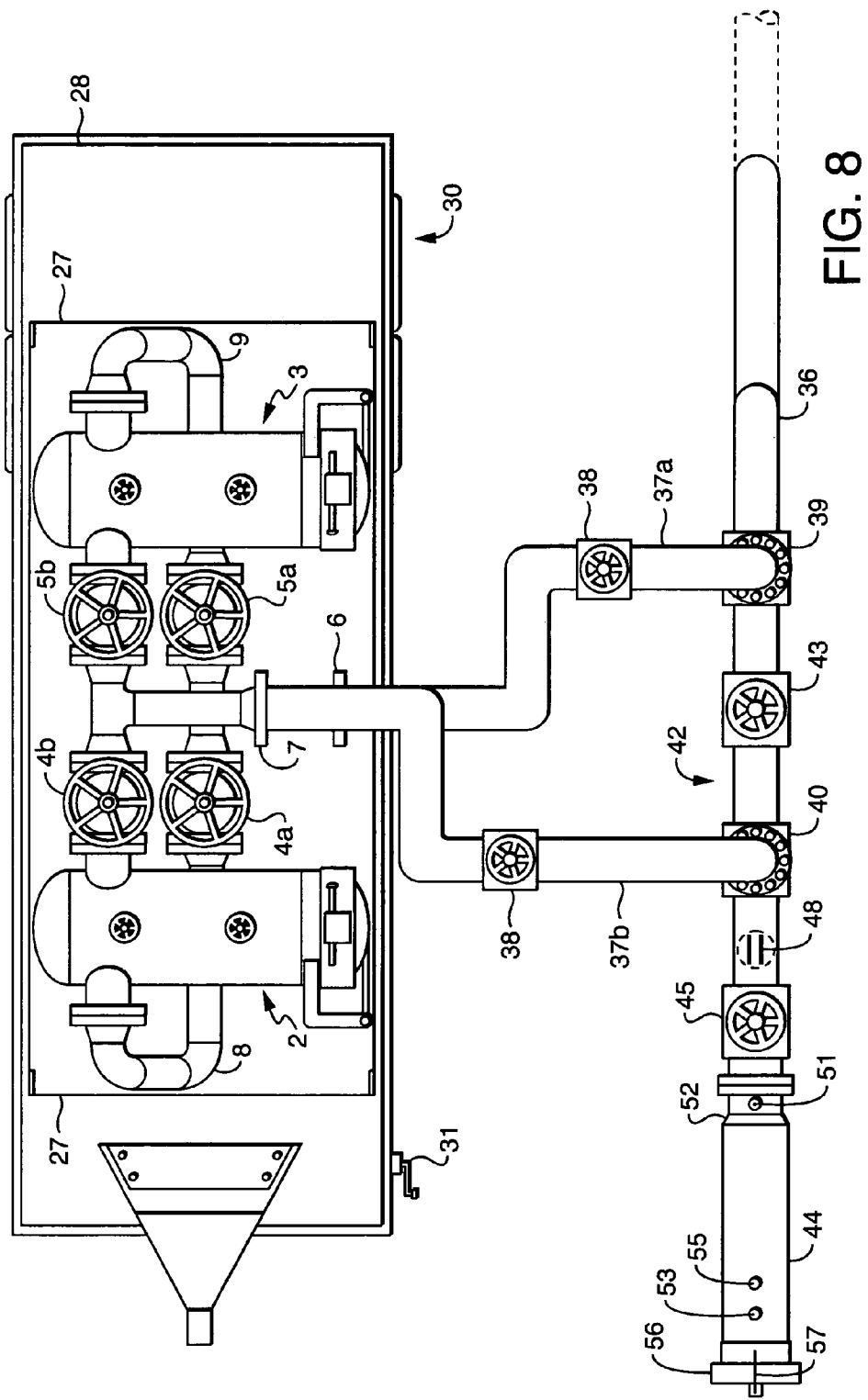
FIG. 8 is a plan view of the filter assembly mounted to a mobile trailer and attached to a pipeline.

Referring to FIGS. 7 and 8, filter assembly 1 is attached to pipeline 36 via upstream spool piece 37*a* and downstream spool piece 37*b*. Pipeline 36 may be any type of pipeline, including without limitation the following: a high pressure gas pipeline, including a natural gas pipeline, ethylene pipeline, oxygen pipeline, methanol pipeline, propylene pipeline, polyethylene pipeline, methane pipeline, polypropylene pipeline, hydrogen pipeline, or the like; liquid pipelines, including oil pipelines, liquid petroleum pipelines, crude oil pipelines, product pipelines and the like; transmission pipelines; gathering pipelines; distribution pipelines; and any other pipeline known to those of skill in the art.

In the embodiment in which pipeline 36 is a high gas pressure pipeline, pipeline 36 should be capable of transporting gaseous products at pressures of 600 psi and higher. Pipeline 36 may also be any size of pipeline, whether a standard sized diameter ranging from 2" to 42" (or larger or smaller as the case may be) or a custom sized pipeline adaptable for a more specific purpose. Finally, pipeline 36 may be constructed of any material suitable for the type, size, and intended application of pipeline 36. It will be readily understood that filter assembly 1 and upstream and downstream spool pieces 37*a* and 37*b* may be resized and configured to adapt to virtually any size or type of pipeline 36.

Upstream and downstream spool pieces 37*a*, 37*b* may be constructed from any material from which pipeline 36 is constructed or from which filter assembly 1 (including filter housing 10) may be constructed. For example, for a 10" high pressure gas pipeline, upstream and downstream spool pieces 37*a*, 37*b* may be fabricated from 10" Schedule 80 piping and ANSI 900 fittings. Upstream and downstream spool pieces 37*a*, 37*b* may contain any necessary fittings to allow them to traverse any course from pipeline 36 to inlet port 6 and from outlet port 7 back to pipeline 36. Preferably, any fittings used in connection with upstream and downstream spool pieces 37*a*, 37*b* should include the appropriate ANSI rating.

If desired, upstream and downstream spool pieces 37*a*, 37*b* may each include one or more isolation valves 38. Isolation valves 38 may be used, for example, to interrupt product flow from pipeline 36 to filter assembly 1 and from filter assembly 1 to pipeline 36 under standard maintenance or emergency conditions. In such cases, it may be necessary to bleed off the pressure that may have accumulated in upstream and downstream spool pieces 37a, 37b prior to detaching filter assembly 1 from spool pieces 37. Isolation valves 38 may be full port or reduced port ball valves with double block and bleed capability. Alternatively, isolation valves 38 may be any type of valve known to those of skill in the art, including those valves described above in connection with valves 4a, 4b, 5a, and 5b.

Upstream and downstream spool pieces 37a, 37b may connect to pipeline 36 via upstream tee connection 39 and downstream tee connection 40. Upstream tee connection 39 and downstream tee connection 40 may be any tee connection fitting known to those of skill in the art. For example, if pipeline 36 is a 12" Schedule 80 pipeline used to transport natural gas at a pressure of approximately 2,000 psi, then upstream and downstream tee connections 39 and 40 may be ANSI 900 tee connections having 20 bolt holes and a flange diameter of 24 inches. If pipeline 36 is a 10" Schedule 80 pipeline capable of transporting natural gas at approximately 2,000 psi, then upstream and downstream tee connections 39, 40 may be ANSI 900 tee connections having 16 bolt holes and a flange diameter of 21½ inches.

If necessary, upstream and downstream spool pieces 37a, 37b may be custom made to adapt to any size fitting and any ANSI bolt pattern. For example, if pipeline 36 is a 12" Schedule 80 pipeline and downstream tee connections 39 and 40 are 12" ANSI 600 tee connections having 20 bolt holes, a flange diameter of 22 inches, and studs of 1¼ inches in diameter, but inlet and outlet ports 6, 7 are capable of receiving 10" ANSI 900 tee connections having 16 bolt holes, a flange diameter of 21½ inches, and studs of 1 and ⅜ inches in diameter, a custom spool adapter (not shown) can be used to successfully join the two differently sized and rated flanges. For example, one end of the adapter could be configured to match the ANSI rating and size of the flange for upstream and downstream tee connections 39, 40, while the other end of the adapter could be configured to match the ANSI rating and size of inlet and outlet ports 6, 7. Multiple adapters could be used in between to step up or step down the ANSI rating and/or pipe size if necessary.

Upstream and downstream tee connections 39, 40 may be located on any section of pipeline 36. As can be seen in FIGS. 7 and 8, upstream and downstream tee connections 39, 40 may be located at an access station 42, such as a monitoring station, cleanout, or other section of pipeline 36 that projects above ground 41. Referring to FIGS. 7 and 8, access station 42 is a section of pipeline 36 that rises from the subsurface to an above ground elevation and then back into the subsurface. Alternatively, upstream and downstream tee connections 39, 40 may be attached to an underground portion of pipeline 36, which would require excavation prior to the attachment of upstream and downstream spool pieces 37a, 37b. Upstream and downstream tee connections 39, 40 may also be attached to virtually any process equipment located within a plant, refinery, manufacturing facility, or the like.

In any case, if upstream and downstream tee connections 39, 40 were not previously installed upon construction of pipeline 36, then the operator has the option of installing upstream and downstream tee connections 39, 40 using "hot tapping" technology, which is known in the art. "Hot tapping" technology, which involves the installation of fittings onto a pressurized section of pipe, will allow the operator to install upstream and downstream tee connections 39, 40 and virtually any other pipe fitting without taking pipeline 36 out of service.

Figure 9:
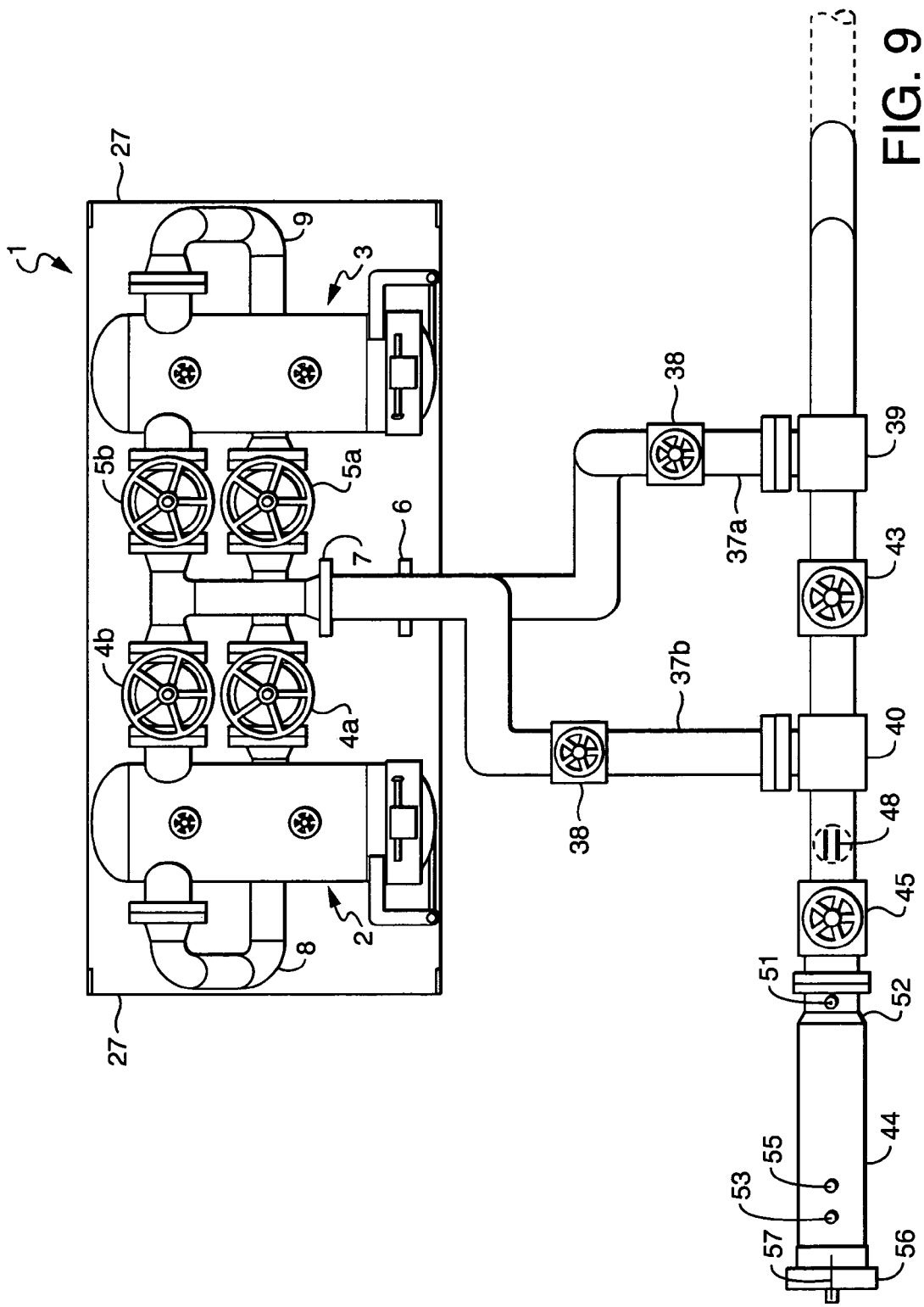
FIG. 9 is a plan view of the filter assembly mounted to a skid and attached to a pipeline.
Figure 10:
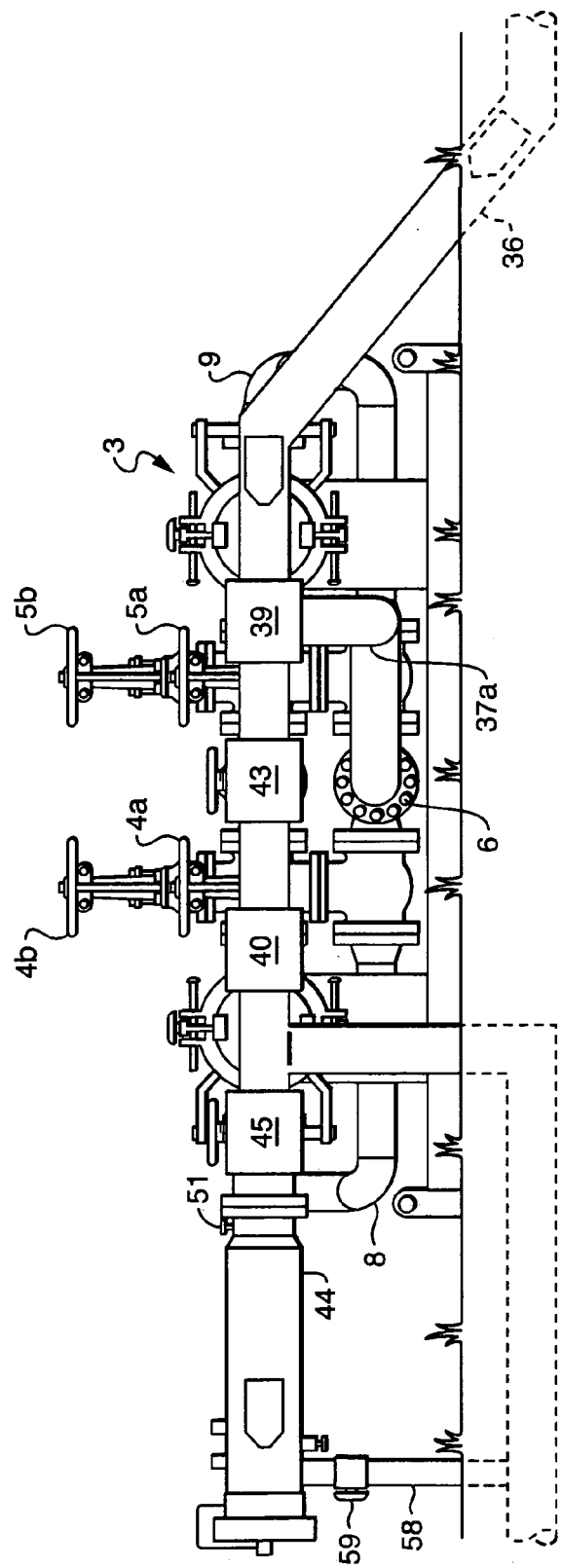
FIG. 10 is a side view of the filter assembly mounted to a skid and attached to a pipeline.
Figure 11:
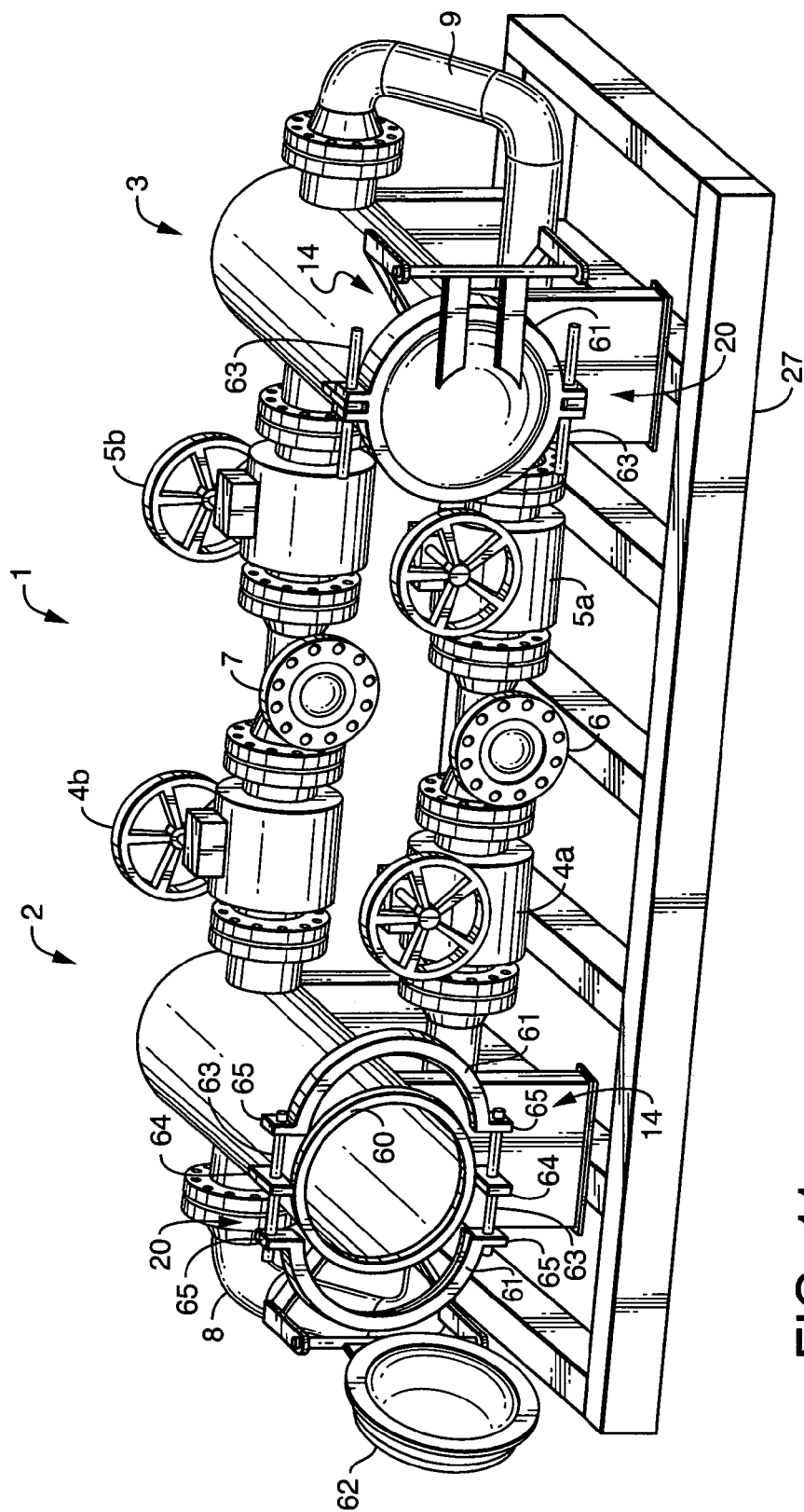
FIG. 11 is a perspective view of an alternate embodiment of the filter assembly.

Upstream and downstream tee connections 39, 40 may be oriented in any direction with respect to pipeline 36. As shown in FIGS. 7 and 8, upstream and downstream tee connections 39 and 40 are oriented in the upward vertical direction with respect to pipeline 36, such that upstream and downstream spool pieces 37a, 37b will attach to upstream and downstream tee connections 39, 40 from above. However, if the operator desires to minimize the occurrence of vertical rises from pipeline 36, then upstream and downstream tee connections 39, 40 may be oriented in the horizontal direction, as shown in FIGS. 9 and 10. A horizontal orientation will prevent product and particulate matter 47 traveling within pipeline 36 from having to move through 90 degree bends in the vertical direction and against the force of gravity, thus ensuring the maximum removal of particulate matter 47 from pipeline 36. In this horizontal embodiment, filter assembly 1 could be placed directly onto ground 41 or otherwise arranged to allow inlet and outlet ports 6, 7 to sit at an elevation that is approximately equal to the elevation of upstream and downstream tee connections 39, 40.

In addition to upstream and downstream tee connections 39 and 40, access station 42 may further include stopple plug 43, pig receiver 44, and pig valve 45. Stopple plug 43, which is located between upstream tee connection 39 and downstream tee connection 40, may be any type of closure valve capable of reducing or stopping product flow through pipeline 36. In this regard, stopple plug 43 may be any ball valve, gate valve, plug valve, or any similar valve known to those of skill in the art that is capable of obstructing flow through pipeline 36 when closed, but when fully open allowing objects of approximately the same width as the inner pipeline diameter to pass. Similar to upstream and downstream tee connections 39, 40, stopple plug 43 may be installed during the pipeline 36 construction phase, or alternatively may be installed using hot tapping technology prior to the use of filter assembly 1.

Pig valve 45 and pig receiver 44, both of which may be attached to the downstream side of downstream tee connection 40, are intended to be used in the recovery of pig 46 from pipeline 36. Pig 46 may be any pigging device known to those of skill in the art, including without limitation foam pigs, inflatable pigs, solid plastic pigs, steel pigs, mandrel pigs, cup pigs, disc pigs, wire brush pigs, gel pigs, sealing pigs, smart pigs, gauging pigs, and the like. For purposes of the following discussion, pig 46 is identified as a cleaning pig (e.g., a wire brush pig). However, it will be readily understood that pig 46 can be any pig set forth in the foregoing discussion.

Pig valve 45 may be similar to or identical to stopple plug 43 and should be capable of obstructing flow when in the closed position, while allowing objects of similar or equal diameter to that of the inner diameter of pipeline 36 to pass when in the open position. Pig receiver 44 may be located downstream from pig valve 45 and may be any type of receiver known to those of skill in the art. The functions and features of pig receiver 44 will be described in more detail in the following paragraphs.

In operation, pig 46 will be inserted into pipeline 36 at a location upstream from access station 42, upstream tee connection 39 and filter assembly 1. A standard pig launcher (not shown) may be used to launch pig 46 into pipeline 36. The distance between the pig launcher and access station 42 will depend on the presence or absence of intervening obstructions, pump stations, compressor stations, or impassable fittings, and/or the type of pig 46 being used. As pig 46 moves through pipeline 36 (in a direction from right to left as shown in FIGS. 7 and 8), its outer abrasive surface will contact the inner surface of pipeline 36, thereby scraping and cleaning the inside diameter of pipeline 36 and creating particulate matter 47. Particulate matter 47 is pushed along in front of pig 46 as it makes its way through pipeline 36.

As pig 46 approaches access station 42, stopple plug 43 is closed, thus forcing the flow of product first through upstream tee connection 39, through upstream spool piece 37a, into inlet port 6, through filter assembly 1, through outlet port 7, and back into pipeline 36 through downstream spool piece 37b and downstream tee connection 40. Pig 46, the forward movement of which is temporarily halted on the upstream side of stopple plug 43, is prevented from entering upstream spool piece 37a due to the presence of pig bars 48, which may be a plurality of mechanical bars or other diameter-reducing obstruction installed within upstream tee connection 39 or within upstream spool piece 37a.

Once stopple plug 43 is closed, particulate matter 47 and product will enter upstream spool piece 37a and thereafter inlet port 6. At the beginning of operation, the operator or contractor may prefer to route all particulate matter 47 and product first through filter module 2 by opening valves 4a and 4b and closing valves 5a and 5b. This action will allow the product and particulate matter 47 carried therein to flow through inlet manifold 32, through valve 4a, through connective piping 8, through inlet flange 11, into filter housing 10, where baffling structure 15 will redirect product and particulate matter 47 towards the end of filter module 2 nearest to closure door 14. From this location, particulate matter 47 and the accompanying product pass by and between filtering members 16 and filter elements 22, where particulate matter 47 is removed from the product and clean product exits through the center of filter seat stools 21, which are hollow and protrude through baffling structure 15 at a location near end cap 13. From this location, the cleansed product exits filter housing 10 through outlet flange 12, then travels through valve 4b, through outlet manifold 33, and through outlet port 7. From outlet port 7, cleansed product is returned to pipeline 36 via downstream spool piece 37b and downstream tee connection 40.

In the event that filtering members 16 and/or filter elements 22 contained in filter module 2 become clogged or consumed or need to be repaired or replaced during the filtering process, the operator or contractor may simply redirect the flow of product and particulate matter 47 to filter module 3, without having to interrupt product flow. This can be accomplished by simply opening valves 5a and 5b, while closing valves 4a and 4b, which will route flow through valve 5a through connective piping 9, through inlet flange 11, and into filter housing 10 of filter module 3, where particulate matter 47 will be removed in the same manner previously discussed. From filter module 3, the redirected product flow will be routed through valve 5b, through outlet manifold 33, through outlet port 7, and back into pipeline 36 through downstream spool piece 37b and downstream tee connection 40.

It will be readily appreciated by those skilled in the art that the opening or closing of valves 4a, 4b, 5a, or 5b could be centrally controlled using a mechanical and/or computer means. For example, valves 4a, 4b, 5a, and 5b could each be connected to a solenoid, each of which in turn could be connected to a computer, which could allow the operator to control the opening and closing of valves 4a, 4b, 5a, and 5b from onsite or from a location remote from filter assembly 1. In addition, a computer program could be configured to automatically regulate the timing of opening and closing of valves 4a, 4b, 5a, and 5b, along with the degree to which each of valves 4a, 4b, 5a, and 5b is opened or closed. For instance, if gauges were installed on filter module 2 to alert the operator as to the need to change one or more filter elements 22 in filter module 2, then the computer program could alert the user to this fact and automatically begin redirecting flow to filter module 3 by gradually opening valves 5a and 5b while closing valves 4a and 4b. Other programming functions known to those of skill in the art are also contemplated by the instant invention.

Once the filtering process is complete, the operator or contractor may remove pig 46 from pipeline 36, which can be accomplished by means known to those of skill in the art. For example, pig 46 may be recovered by opening stopple plug 43, opening pig valve 45, and optionally closing isolation valves 38, which will have the effect of redirecting product flow through pipeline 36. In addition, pressure balance valve 59 must be opened in order to allow product to flow through pressure balance line 58, which connects the end of pig receiver 44 with the downstream end of pipeline 36. The movement of product through pipeline 36 will force pig 46 through opened stopple plug 43, through downstream tee connection 40, past pipeline tee 49 (shown in FIG. 7), through pig valve 45, and into pig receiver 44, which may be connected to pipeline 36 via a flanged connection 50. Pig 46 is prevented from moving further along pipeline 36 and into pipeline tee 49 due to the presence of pig bars 48 obstructing the horizontal threshold at pipeline tee 49, where pipeline 36 is redirected into the subsurface. Pig bars 48 can be seen in FIG. 8, and may include any other means known in the art to prevent pig 46 from entering a given section of pipeline 36.

The operator or contractor may be alerted to the entry of pig 46 into pig receiver 44 by use of pig signaler 51, which may be located immediately prior to expander 52. Pig signaler 51 may be any type of pig alert device known to those of skill in the art, including mechanical pig signalers or electronic pig signalers.

Once pig signaler 51 has indicated the presence of pig 46, the operator or contractor may retrieve pig 46 by closing pig valve 45, closing pressure balance valve 59, depressurizing pig receiver 44 using depressurizer 53, draining any fluids from pig receiver using receiver drain 54, purging the receiver using receiver purge 55, and then opening receiver closure door 56. Depressurizer 53 may be similar to and functions in the same manner as pressure relief valve 23, discussed above in connection with filter modules 2, 3. Receiver drain 54 may be similar to and function in the same manner as drain 25, as also discussed in connection with filter modules 2, 3. Receiver purge 55 functions in the same manner and may be similar or identical to nitrogen purge valve 24, which is described in connection with filter modules 2, 3 above.

Receiver closure door 56 is shown in FIGS. 7 and 8 as including receiver hinge 57 for supporting receiver closure door 56 when removed from pig receiver 44. Alternatively, receiver closure door 56 may be similar or identical to closure door 14 as described in connection with filter modules 2, 3 above. Receiver closure door 56 may also have a locking means (not shown) that is similar, identical, or equivalent to locking mechanism 20 described in connection with closure door 14 for filter modules 2, 3 above.

A number of alternative embodiments are contemplated by the foregoing inventions. For example, although one embodiment of filter assembly 1 has been described to include two filter modules 2, 3, an alternative embodiment could include a plurality of filter modules, including three, four, five, or any number of filter modules joined together by a single manifold to allow filtration using one or more filters at a time. Alternatively, filter assembly 1 could include a single filter module and a reduced number of valves, if so desired by the user. Another alternative embodiment could involve the connection of multiple filter assemblies 1 (as previously described) together in parallel or in series, such that two (4 filter modules), three (6 filter modules), four (8 filter modules), five (10 filter modules), or any number of filter assemblies 1 could be utilized together to remove particulate matter 47 or other impurities from various products. In such circumstances, it will be readily understood that a computer program or the like could be used to open and close the various valves for each individual filter assembly 1.

There are of course other alternate embodiments that are obvious from the foregoing descriptions of the invention, which are intended to be included within the scope of the invention, as defined by the following claims.

We claim:
1. A filter assembly for filtering a fluid transported by a pipeline, which assembly comprising;
  a) a first manifold having a lateral projecting flanged inlet port, which flanged inlet port is capable of being sealingly connected to a pipeline for transporting fluids and which first manifold has a plurality of outlet ports;
  b) a plurality of first set of valves, each having a inlet port and an outlet port and wherein the inlet port of a first valve is fluidly and sealingly connected to an outlet port of said first manifold, such that each outlet port of said first manifold has connected to a first valve;
  c) a plurality of filter modules each comprised of:
  i) a cylindrical shaped housing having a first end which is closed and a second end which is open; ii) a removable end cap at said second end which end cap is capable of closing and sealing said second end; iii) a baffle plate within said housing positioned within said housing and secured around the entire inside circumference of said housing at a predetermined angle and distance from said first end of said housing thereby defining a space between said baffle plate and said first end; iv) a plurality of tubular filter elements each having outer surfaces and an inner bore capable of filtering a fluid from its outer surface to its inner bore, which plurality of filter elements are longitudinally disposed within said housing extending from said open end and through said baffle plate and partially into said space within said first end such that only fluid from the inner core of said filter elements is capable of entering said space within said first end; v) an inlet port positioned on the side of said housing between said baffle plate and said second end; and vi) an outlet port positioned on the side of said housing between said baffle plate and said first end;
  d) a plurality of second set of valves, each having an inlet port and an outlet port, wherein an inlet port of each second valve is sealingly and fluidly connected to the outlet port of a filter module such that each filter module has associated therewith a second valve; and
  c) a second manifold having a lateral projecting flanged outlet port, which flanged outlet port is capable of being sealingly connected to a pipeline for transporting fluids and which second manifold has a plurality of inlet ports wherein each inlet port of said second manifold is sealingly connected to an outlet port of a second valve.

2. The filter assembly described in claim 1, wherein said pipeline is a high pressure gas pipeline.

3. The filter assembly described in claim 1, wherein said filtering members from one of said filter modules may be changed without interrupting said flow of said product conveyed by said pipeline.

4. The filter assembly described in claim 1, wherein at least of said filter modules further comprise, within said housing, a baffle plate for redirecting said product flow in a direction substantially parallel to the orientation of said filtering members.

5. The filter assembly described in claim 1, wherein said filter assembly is capable of withstanding internal pressures of 2,000 psi.

6. The filter assembly described in claim 1, wherein one or more of said first set of valves and one or more of said second set of valves are capable of being opened and closed using a computer program.

7. The filter assembly described in claim 1, wherein a plurality of filter assemblies are employed in series to filter said flow of product conveyed by said pipeline.

8. The filter assembly described in claim 1, wherein a plurality of filter assemblies are employed in parallel to filter said flow of product conveyed by said pipeline.

9. The filter assembly described in claim 1, wherein said filter assembly is capable of being mounted on a skid.

10. The filter assembly described in claim 1, wherein said filter assembly is capable of being mounted on a trailer.

11. The filter assembly described in claim 1, wherein said filter assembly is fluidly attached to said pipeline.

12. The filter assembly described in claim 1, wherein said filter assembly is used in connection with a pipeline pig.

13. A filter assembly for filtering a fluid transported by a pipeline, which assembly comprising;
  a) a first manifold having a lateral projecting flanged inlet port, which flanged inlet port is capable of being sealingly connected to a pipeline for transporting fluids and which first manifold has a plurality of outlet ports;
  b) a plurality of first set of valves, each having a inlet port and an outlet port and wherein the inlet port of a first valve is fluidly and sealingly connected to an outlet port of said first manifold, such tat each outlet port of said first manifold has connected to a first valve;
  c) a plurality of filter modules capable of withstanding internal pressures of at least about 600 psig, each comprised of:
  i) a cylindrical shaped housing having a first end which is closed and a second end which is open; ii) a removable end cap at said second end which end cap is capable of closing and sealing said second end; iii) a baffle plate within said housing positioned within said housing and secured around the entire inside circumference of said housing at a predetermined angle and distance from said first end of said housing thereby defining a space between said baffle plate and said first end; iv) a plurality of tubular filter elements each hiving outer surfaces and an inner bore capable of filtering a fluid from its outer surface to its inner bore, which plurality of filter elements are longitudinally disposed within said housing extending from said open end and through said baffle plate and partially into said space within said first end such that only fluid from the inner core of said filter elements is capable of entering said space within said first end; v) an inlet port positioned on the side of said housing between said baffle plate and said second end; and vi) an outlet port positioned on the side of said housing between said baffle plate and said first end;
  d) a plurality of second set of valves, each having art inlet port and an outlet port, wherein an inlet port of each second valve is sealingly and fluidly connected to the outlet port of a filter module such that each filter module has associated therewith a second valve; and e) a second manifold having a lateral projecting flanged outlet port, which flanged outlet port is capable of being sealingly connected to a pipeline for transporting fluids and which second manifold has a plurality of inlet ports wherein each inlet port of said second manifold is sealingly connected to an outlet port of a second valve.

14. The filter assembly described in claim 13, wherein said filter modules are capable of withstanding an internal pressure of 2,280 psi.

15. The filter assembly described in claim 13, wherein said filter assembly avoids the need to take said high pressure gas pipeline out of service when filtering said flow of product.

16. The filter assembly described in claim 13, wherein said filter modules further comprise one or more filtering members, wherein said one or more filtering members may be changed without interrupting said flow of said product conveyed by said high pressure gas pipeline.

17. The filter assembly described in claim 13, wherein at least of said filter modules further comprise, within said housing, a baffle plate for redirecting said product flow in a direction substantially parallel to the orientation of said filtering members.

18. The filter assembly described in claim 13, wherein said upstream spool piece and said downstream spool piece are adaptable to fit any size high pressure gas pipeline and fittings of any pressure rating.

19. The filter assembly described in claim 13, wherein at least one of said first set of valves and at least one of said second set of valves are capable of being opened and closed using a computer program.

20. The filter assembly described in claim 13, wherein a plurality of filter assemblies are employed in series to filter said flow of product conveyed by said pipeline.

21. The filter assembly described in claim 13, wherein a plurality of filter assemblies are employed in parallel to filter said flow of product conveyed by said pipeline.

22. The filter assembly described in claim 13, wherein said filter assembly is capable of being mounted on a skid.

23. The filter assembly described in claim 13, wherein said filter assembly is capable of being mounted on a trailer.

24. The filter assembly described in claim 13, wherein said filter assembly is fluidly attached to said pipeline.

25. The filter assembly described in claim 13, wherein said filter assembly is used in connection with a pipeline pig.

26. The filter assembly described in claim 13, wherein said flow of product may be switched from one of said filter modules to another of said filter modules without interrupting said flow of product.

27. A method for filtering particulate matter from a high pressure gas pipeline, which method comprising;
A) providing a filter assembly comprising:
a) a first manifold having a lateral projecting flanged inlet port, which flanged inlet port is capable of being sealingly connected to a pipeline for transporting fluids and which first manifold has a plurality of outlet ports;
b) a plurality of first set of valves, each having a inlet port and an outlet port and wherein the inlet port of a first valve is fluidly and sealingly connected to an outlet port of said first manifold, such that each outlet port of said first manifold has connected to a first valve;
c) a plurality of filter modules each comprised of:
i) a cylindrical shaped housing having a first end which is closed and a second end which is open; ii) a removable end cap at said second end which end cap is capable of closing and sealing said second end; iii) a baffle plate within said housing positioned within said housing and secured around the entire inside circumference of said housing at a predetermined angle and distance from said first end of said housing thereby defining a space between said baffle plate and said first end; iv) a plurality of tubular filter elements each having outer surfaces and an inner bore capable of filtering a fluid from its outer surface to its inner bore, which plurality of filter elements are longitudinally disposed within said housing extending from said open end and through said baffle plate and partially into said space within said first end such that only fluid from the inner core of said filter elements is capable of entering said space within said first end; v) an inlet port positioned on the side of said housing between said baffle plate arid said second end; and vi) an outlet port positioned on the side of said housing between said baffle plate and said first end;

d) a plurality of second set of valves, each having an inlet port and an outlet port, wherein an inlet port of each second valve is sealingly and fluidly connected to the outlet port of a filter module such that each filter module has associated therewith a second valve; and e) a second manifold having a lateral projecting flanged outlet port, which flanged outlet port is capable of being sealingly connected to a pipeline for transporting fluids and which second manifold has a plurality of inlet ports wherein cach inlet port of said second manifold is seal angle connected to an outlet port of a second valve;

B) connecting the lateral projecting flanged inlet port of said first manifold to a high pressure gas pipeline so that gas from said pipeline can flow into said flanged inlet port; and C) connecting the lateral projecting flanged outlet port of said second manifold to said pipeline at a position downstream of said flanged inlet port of said first manifold.

28. The method described in claim 27, wherein said entire filter assembly is capable of withstanding an internal pressure of at least approximately 2,000 psi.

29. The method described in claim 27, wherein said filter assembly avoids the need to take said high pressure gas pipeline out of service when filtering said flow of product.

30. The method described in claim 27, wherein said filter modules further comprise one or more filtering members, wherein said one or more filtering members may be changed without interrupting said flow of said product conveyed by said high pressure gas pipeline.

31. The method described in claim 30, wherein at least one of said filter modules further comprise, within said housing a baffle plate for redirecting said product flow in a direction substantially parallel to the orientation of said filtering members.

32. The method described in claim 27, wherein one or more of said first set of valves and one or more of said second set of valves are capable of being opened and closed using a computer program.

33. The method described in claim 27, wherein a plurality of filter assemblies are employed in series to filter said flow of product conveyed by said pipeline.

34. The method described in claim 27, wherein a plurality of filter assemblies are employed in parallel to filter said flow of product conveyed by said pipeline.

35. The method described in claim 27, wherein said filter assembly is capable of being mounted on a skid.

36. The method described in claim 27, wherein said filter assembly is capable of being mounted on a trailer.

37. The method described in claim 27, wherein said filter assembly is fluidly attached to said pipeline using hot tapping technology.

38. The method described in claim 27, wherein said filter assembly is used in connection with a pipeline pig.

39. The method described in claim 38, wherein a pipeline pig forces particulate matter into said flanged inlet port of said first manifold via a spool piece, through said filter assembly, and back into said high pressure pipeline through said flanged outlet port via a spool piece.

40. The filter assembly described in claim 13, wherein said entire filter assembly is capable of withstanding an internal pressure of at least approximately 2,000 psi.

* * * * *